May 2, 1961 L. E. HOYER 2,982,571
DUST GUARDS
Filed Dec. 12, 1957 3 Sheets-Sheet 1
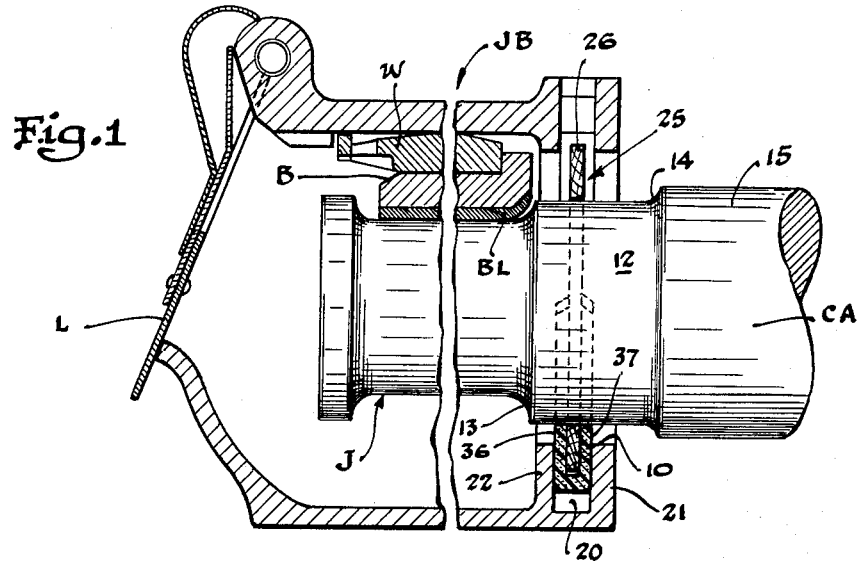
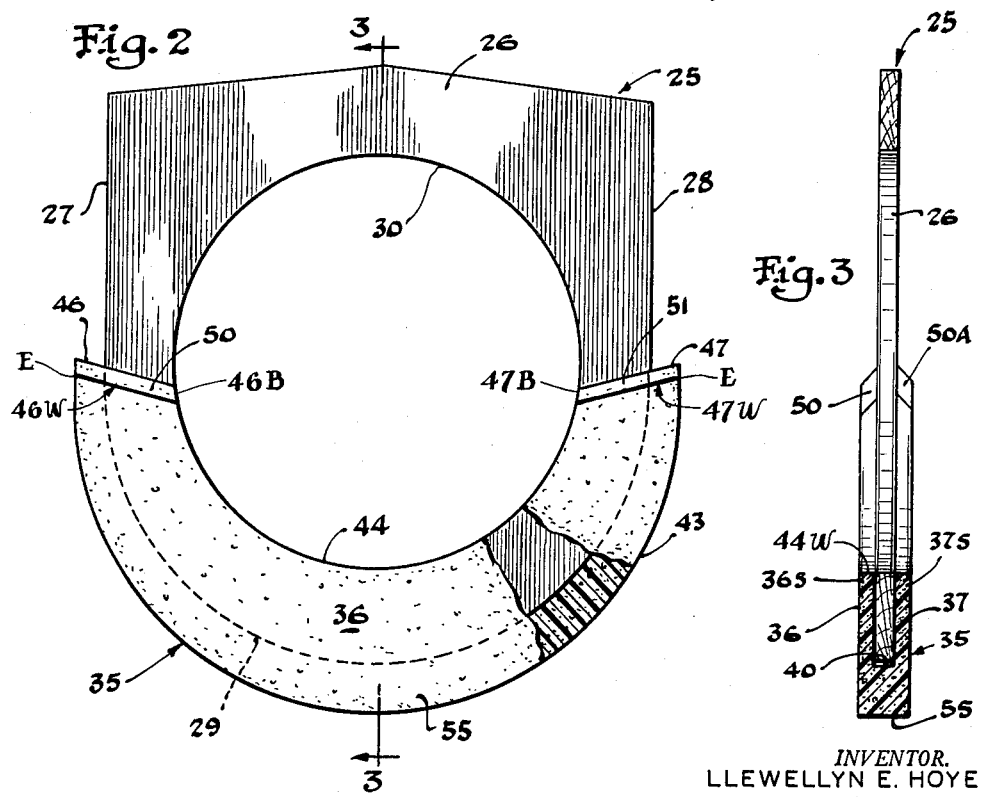
*INVENTOR.*
LLEWELLYN E. HOYER
BY
*Wallace and Cannon*
ATTORNEYS May 2, 1961 L. E. HOYER 2,982,571
DUST GUARDS
Filed Dec. 12, 1957 3 Sheets-Sheet 2
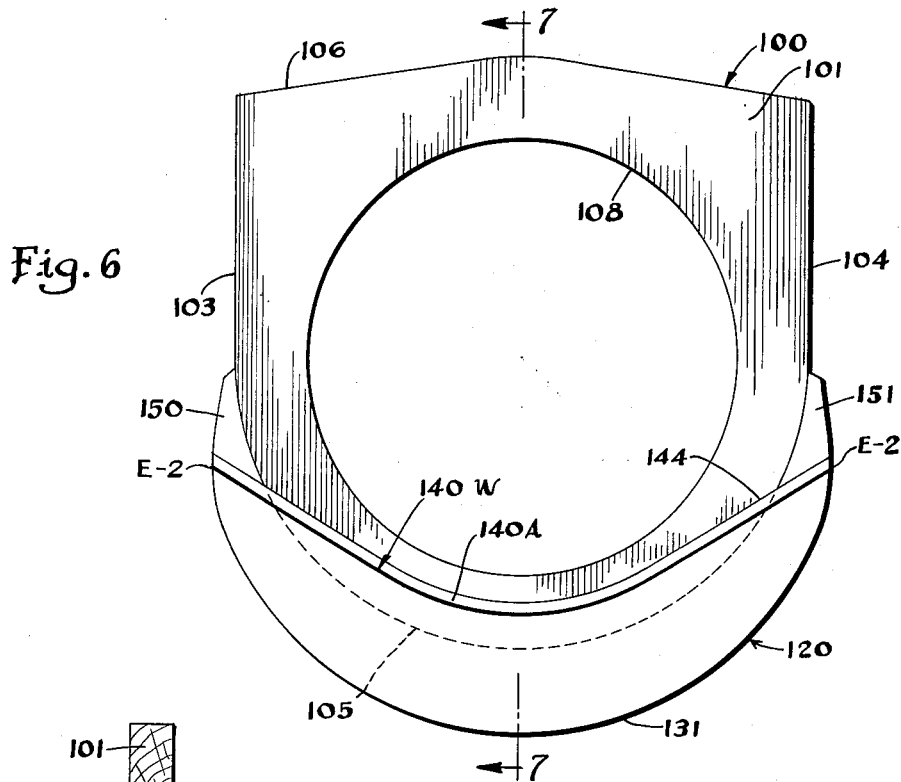
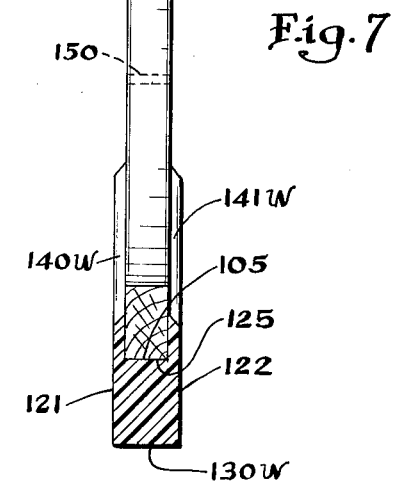
INVENTOR.
LLEWELLYN E. HOYER
BY *Wallace and Cannon*
ATTORNEYS May 2, 1961 L. E. HOYER 2,982,571
DUST GUARDS
Filed Dec. 12, 1957 3 Sheets-Sheet 3
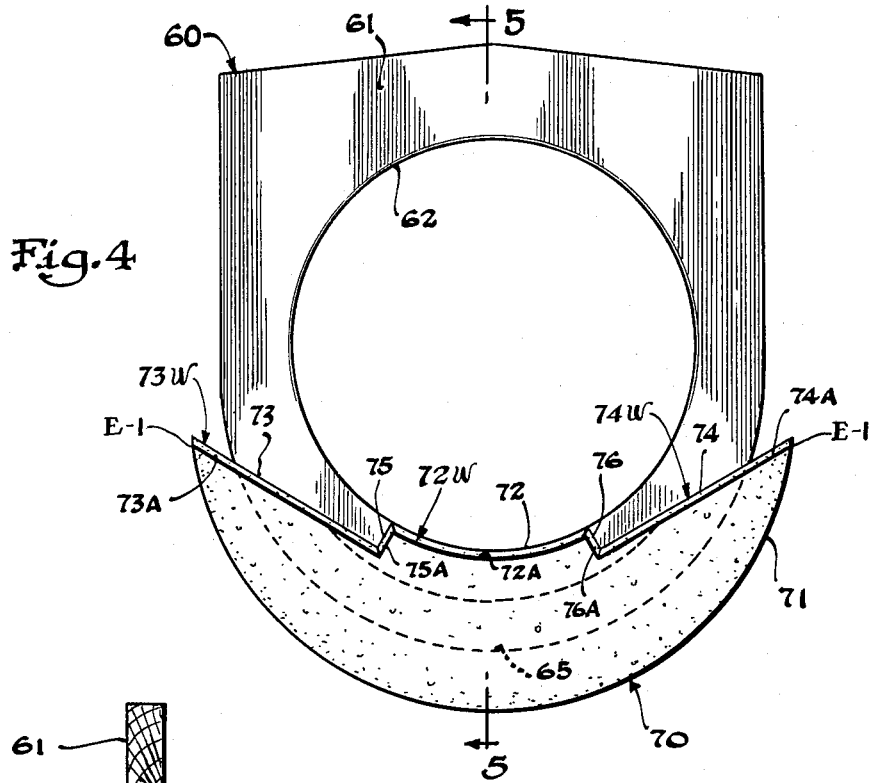
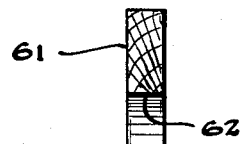
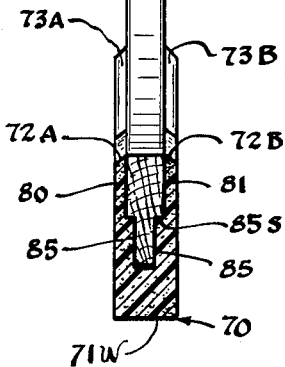
INVENTOR.
LLEWELLYN E. HOYER
BY
Wallace and Cannon
ATTORNEYS

United States Patent Office 2,982,571
Patented May 2, 1961

2,982,571
DUST GUARDS

Llewellyn E. Hoyer, Wyckoff, N.J., assignor to American Brake Shoe Company, New York, N.Y., a corporation of Delaware Filed Dec. 12, 1957, Ser. No. 702,450

9 Claims. (Cl. 286—6)

This invention relates to a dust guard and more particularly to a dust guard for the journal box of a railway car. This application is a continuation-in-part of my application Ser. No. 635,666 filed Jan. 23, 1957, now abandoned.

The proper lubrication of a journal of the kind that is extended into a journal box is in many instances related to the dust guard. One particularly troublesome problem is proper retention of the dust guard in the journal box. There are numerous proposals in the prior art in this regard, but the chief objection in most instances is the relatively high cost of the structure detailed. On the other hand, while it is apparent that a plain wooden dust guard per se is probably the cheapest form of dust guard, such has never produced an entirely satisfactory seal of the journal box. In view of the foregoing, the primary object of the present invention is to enable the journal box of a railway car or the like to be effectively sealed by a dust guard of such construction as to be relatively inexpensive to manufacture and maintain during subsequent use, and an object related to this is to enable a relatively inexpensive dust guard embodying a seal plate of plywood or like rigid material to be effectively retained in position in a journal box in surrounding relation about a journal.

The primary function of a dust guard is of course to prevent loss of lubricant from within the journal box and to prevent the passage of dust or like foreign matter thereto from the outside of the journal box. This entails a proper sealing relation between the dust guard and the journal box. Another object of the present invention is to effectively seal the journal box with a dust guard which nevertheless embodies relatively inexpensive structure, and an object related to this is to associate with the seal plate of the dust guard a retainer which can be easily replaced if worn or damaged.

If a dust guard seal for a journal box embody a plywood or like relatively rigid seal plate of less width than the slot in the journal box in which it is mounted, there is less chance of breaking of the seal plate due to movement of the journal. In other words, if the dust guard at all portions were as wide as the dust guard slot and composed of relatively rigid material such as plywood or the like, it is possible for the guard to be ruptured or broken in those instances where one of the fillet surfaces on the journal shifts suddenly with great force against the dust guard. However, a full width dust guard does have the advantage of being capable of effectively sealing the complete width of the dust guard slot particularly at the bottom thereof, but on the other hand a dust guard of less narrow width than the width of the dust guard slot has the advantage of venting the interior of the journal box which prevents build-up of pressure therein due to what in effect represents a pumping action by the journal during axial thrust of the car axle. Another object of the present invention is to effectively close off the lower portion of the dust guard slot of a journal box while assuring that the upper extent of the dust guard slot is occupied by portions of the dust guard of less width than the dust guard slot thereby enabling the journal box to be easily vented at the top thereof where there is least likelihood of loss of lubricant or ingress of foreign matter.

Another object of the invention is to utilize a resilient high friction retainer which enables the foregoing to be accomplished and which is capable of yielding in the event of a thrust of the journal against the dust guard.

Other and further objects of the present invention will be apparent from the following description and claims and are illustrated in the accompanying drawings which, by way of illustration, show preferred embodiments of the invention, the principles thereof and what I now consider to be the best mode contemplated for applying those principles. Other embodiments of the invention embodying the same or equivalent principles may be used and changes may be made as desired by those skilled in the art without departing from the present invention and the purview of the appended claims.

In the drawings:

Fig. 1 is a sectional view of the journal box of a railway car having a dust guard of the present invention mounted therein;

Fig. 2 is an elevation of a dust guard of the present invention;

Fig. 3 is a sectional view taken on the line 3—3 of Fig. 2;

Fig. 4 is a plan view of a modified form;

Fig. 5 is a section taken on the line 5—5 of Fig. 4;

Fig. 6 is an elevation of still another modified form of the invention; and

Fig. 7 is a sectional view taken on the line 7—7 of Fig. 6.

In Fig. 1 there is shown a journal box JB of standard construction in which the journal J of a railway car axle CA is adapted to rotate. A segmental bearing B of standard form and construction is arranged in the upper part of the journal box and is provided with a lining BL of bearing metal and on which a journal J rotates. The bearing B is retained in place by a wedge W of the usual kind.

The front of the journal box JB is represented by a lid L which, as is well known, enables the journal box to be inspected particularly for the purpose among others of checking on the supply of lubricant and the condition of the lubricator and bearing in the journal box. As is well known, lubricant for the bearing B and a lubricator which is adapted to relay such lubricant to the journal J are usually provided in the bottom of the journal box beneath the journal J, but inasmuch as these aspects of practices in the art are well known such have not been illustrated herein.

The rear side of the journal box opposite the lid L is on the side next to the wheel (not shown) of the car. It is from this side of the journal box that the journal J is extended into the journal box, and to enable this to be accomplished the journal box JB includes a relatively large opening 10 through which the journal portion J of the car axle is adapted to extend. It is the opening 10 as thus provided which needs to be sealed or closed off by a dust guard, the dust guard being such as to surround the so-called dust guard seat portion 12 of the journal J. It will be observed that the boundaries of the dust guard seat 12 are defined by conventional filleted surfaces 13 and 14 which lie adjacent the journal J and the wheel seat 15, respectively, of the car axle.

As was mentioned previously, the journal box JB is of standard construction, and under the present invention advantage is taken of the standard dust guard slot 20 which is formed therein. Thus, the dust guard slot 20 is defined by a pair of spaced apart walls 21 and 22 having inner peripheries or edges which define the opening 10 in the journal box through which the journal J is extended, and a dust guard 25 constructed in accordance with the present invention is adapted to be mounted in the dust guard slot 20 as will now be explained.

The dust guard 25, Figs. 2 and 3, includes a relatively rigid seal plate 26 of plywood or the like having opposed side edges 27 and 28 and a rounded bottom edge 29. Thus, the edges 27, 28 and 29 are complementary in outline to the outline of the dust guard slot 20 which as is well known is generally of U shape. The outside dimensions of the plate 26 are slightly larger than the inside dimensions of the dust guard slot 20 so that when the central or medial opening 30 in the plate 26 is concentrically related to the opening 10 in the journal box, marginal portions of the panel 26 extend into the dust guard slot on all sides.

In accordance with the present invention, the dust guard 25 includes a retainer of resilient relatively high friction material which is adapted to engage frictionally and tightly the inner faces or sides of the walls 21 and 22 affording the bottom portion of the dust guard slot so as to hold the plate 26 accurately in the intended position. Such positioning is of course not a fixed relationship, and the retainer, as will be described hereinafter, is of such nature as to enable the dust guard 25 to yield in those instances where an axial thrust is exerted thereagainst by the car journal. Moreover, the arrangement is such that the interior of the journal box is vented, and this is achieved by having the retainer of greater width than the width of the plate 26 so that at least the upper marginal edge portion of the plate 26 will occupy less than the full width of the top of the dust guard slot as shown in Fig. 1.

Thus, in accordance with the present invention, the dust guard 25 includes a U-shaped retainer 35 composed of a resilient but relatively high friction synthetic material such as polyurethane or the like. The retainer 35, as will be observed particularly in Fig. 2, is of substantially less peripheral extent than the plate 26, and in the present instance is complementary to but the lower half of the plate 26. Thus, under the present invention, the retainer 35 in outline represents but a segment or portion of the outline of the plate 26, and this segmental relationship prevails of course in respect of the dust guard slot 20.

As shown in Fig. 1, the retainer 35 is of greater width than the width of the plate 26 for the purpose mentioned above, and includes what represents a substantially flat inner face 36 which faces inwardly of the journal box when in operative position as shown in Fig. 1 and a substantially flat outer face 37 which under such circumstances faces toward the car wheel. The retainer 35 is molded or otherwise formed with a slot 40, Fig. 3, which is complementary in outline to the section of the plate or panel 26 to which the retainer 35 is to be affixed. In other words, the means on the retainer 35 which enables the retainer 35 to be associated with or mounted on the plate 26 is preferably represented by a slot in which the panel 26 in effect is inserted. It may be pointed out, however, that such association can be effected as an incident to molding of the retainer 35. Thus, the plate 26 can be arranged in a mold in which the basic material of which the retainer 35 is to be composed is added for formation and cure, and under such circumstances it is found that the retainer 35 is effectively bonded to the plate 26. It will of course be realized that the retainer 35 can be separately molded and the mold cored to provide the groove 40, or the retainer 35 can be molded solid and the groove 40 provided by a milling operation or the like; and in either event the retainer 35 can be bonded by a selected adhesive to the plate 26, or the slot 40 can be of such width as to afford an effective press fit between the plate 26 and the retainer 35. It will be further realized from the foregoing that a particular retainer as 35 when worn or extended beyond its useful life can be removed from the associated plate 26 and a new retainer 35 affixed to the same plate 26.

As shown particularly in Fig. 1, the side or wall portions 36S and 37S, Fig. 3, of the retainer 35 are of substantial thickness in comparison to the plate 26, and the relation is such that the width of the retainer 35 between the faces 36 and 37 is slightly larger than the width of the dust guard slot 20. As a consequence of this, the retainer 35 in effect fills up the lower portion of the dust guard slot 20 thereby efficiently sealing the bottom of the journal box where the lubricant and the lubricator are provided, and this of course prevents loss of lubricant from the interior of the journal box. However, inasmuch as the upper section of the plate 26 is free of the retainer 35, the plate 26 when in operative position in the journal box as shown in Fig. 1 is spaced from the walls of the dust guard slot at the upper portion thereof, and this enables the interior of the journal box to be vented thereby preventing the build-up of pressure within the journal box as an incident of pumping movement of the journal J. It should be pointed out that the top of the dust guard slot can be closed by a conventional wood block or plug.

An important aspect of the present invention is that the retainer 35 is so constructed as to assure proper drainage back to the journal box of lubricant that may collect on the journal or be splashed therefrom. Thus, as shown in Figs. 2 and 3, the retainer 35 is defined in outline by an outer or bottom arcuate peripheral wall 55 and edge 43 corresponding thereto of greater circumference than the corresponding rounded edge 29 at the bottom of the panel 26, and which is complementary to the lower half of the dust guard slot 20; and a rounded upper wall 44W and medial or intermediate edge 44 corresponding thereto which is complementary to and coincident with the lower portion of the opening 30 in the panel 26. The side 36 of the retainer 35 is beveled to provide opposite upper end walls 46W and 47W and end edges 46 and 47 corresponding thereto. The edges 46 and 47 are in effect outward extensions of the edge 44. The foregoing prevails with respect to both sides 36 and 37 of the retainer 35, inasmuch as the retainer 35 is symmetrical on both sides for a reason to be pointed out hereinafter.

The upper end walls 46W and 47W of the retainer 35 corresponding to the end edges 46 and 47 are beveled to lie in planes 50 and 51 which as shown in Fig. 3 slope downwardly from the end edges 46 and 47 toward the face or side 36 of the retainer 35. The innermost boundaries 46B and 47B of the walls 46W and 47W extend to the boundary of the journal opening 30 so as to be colinear therewith. This relation prevails on both sides 36 and 37 of the retainer 35 so that there is a flat face or sloped plane 50A corresponding to the end of the wall 37 of the retainer directly opposite the sloped plane 50. As shown in Fig. 2, the end wall planes 50 and 51 extend inwardly from the ends E of the edge 43 and slope downwardly away from the ends E toward the medial part of the retainer, and this is likewise true with respect to the end walls of the other side or face 37 of the retainer as shown in Fig. 3.

Thus, the arrangement of the end walls of the retainer 35 is such as to provide shed surfaces 50—51 which assure return of lubricant that may be picked up by the journal to the interior of the journal box, that is, in the event that lubricant is wiped, splashed or otherwise entrained on the dust guard outwardly of the journal, this migrant lubricant is drained back to the journal box oil reservoir away from the edge 46 or 47 and away from the outer peripheral wall and edge 43 of the retainer which of course lies adjacent the dust guard slot. Likewise, water picked up from the road bed over which the car is traveling and collected on the dust guard will be shed by the surfaces as 50A and thereby drained away from the end and peripheral edges of the wall 37 which faces outwardly of the journal box, and this effectively prevents entrance of water into the interior of the journal box.

Another important advantage of the present invention is that it will be recognized that the retainer 35 is fully reversible, that is, inasmuch as the retainer 35 is symmetrical in all respects, it makes no difference as to positioning of the dust guard 25 in the dust guard slot, and during replacement of a retainer as 35 side or face relationships are likewise immaterial. Of particular significance is the fact that while the lower part of the dust guard slot is completely filled and sealed, the dust guard is nevertheless capable of yielding upon a sudden thrust thereagainst axially by the car axle, this being due of course to the yieldable nature of the retainer 35. Moreover, in the event the journal box is jacked the dust guard 25 in effect moves downward in the dust guard slot. Heretofore, this has caused damage to the lower edge of a rigid seal plate, but inasmuch as the lower edge of the seal plate 26 in the present instance is protected by the lower solid wall portion 55 which is of substantial thickness, the lower extent of the retainer will merely compress during jacking of the journal box.

A modification of the foregoing is shown in Figs. 4 and 5 as embodied in a dust guard 60 including a seal plate 61 of the kind described above having an opening 62 in the medial portion thereof through which the journal is adapted to be passed. The retainer in this instance is also of resilient foam-like resin or plastic molded to have inner and outer substantially flat faces as in the foregoing embodiment, and it will be appreciated that in all instances the retainer will of course be of oil resistant material. The retainer 70 includes an outer or lower peripheral wall 71W and edge 71 corresponding thereto; an inner or upper intermediate wall 72W and edge 72 corresponding thereto; and upper end walls 73W and 74W and end edges 73 and 74 corresponding thereto, respectively, and extended outwardly of the intermediate wall 72W. As in the foregoing embodiment, the upper walls 73W and 74W are provided in effect by beveling the inner face of the retainer to afford shed surfaces. The edge 72 abuts the corresponding portion of the journal opening 62 as in the above described embodiment of Fig. 2, but in this instance the aforesaid upper walls 73W and 74W are spaced from the upper wall 72W by shoulders having edges 75 and 76 coresponding thereto, and these shoulders, it will be observed in Fig. 4, are substantially normal to the end edges 73 and 74, whereby the innermost boundaries of the upper end walls 73W and 74W are spaced from and below the journal opening 62.

The wall of the retainer 70 corresponding to the edge 72 is also beveled to lie in a sloped plane 72A, and inasmuch as the retainer 70 is symmetrical in all respects, there is a like wall disposed in a sloped plane 72B on the opposed side of the retainer adjacent the opening 62 in the plate 61. As viewed in Figs. 4 and 5, it can be assumed that the wall 72W will face toward the interior of the journal box and that the opposite wall disposed in the plane 72B will face toward the car wheel. These two walls having planes 72A and 72B slope downwardly in a direction proceeding away from the corresponding upper edge as 72, and this downward sloping is in a direction proceeding toward the related inner or outer substantially flat side or face 80 or 81 of the retainer. In this way, lubricant that may collect about the edge 72 is shed by the wall 72W and drained away from the journal and back into the journal box, and in like manner water or other foreign liquid at the outside of the journal box is drained away from the journal due to the downward sloping of the wall having the plane 72B.

The shoulders having the edges 75 and 76 assure that lubricant which may be splashed outwardly by the rotating journal, or due to motion of the journal box, and which collects on or about the end edges 73 and 74 is prevented from migrating toward the journal. In other words, the right angular configuration at the juncture between the above mentioned shoulders and end walls constitute lubricant traps, and the sloped end walls 73A and 74A slope downwardly and away from the related upper edges 73 and 74 thereof and also downwardly and away from the opposite ends E–1 and E–2 of the outer peripheral wall edge 71 toward the medial part of the retainer represented by the wall 72W in each instance, causing lubricant to drain away from the peripheral edge 71 adjacent the dust guard slot and toward the shoulders having edges 75 and 76 and also away from the edges 73 and 74 of the upper end walls.

It is also of advantage to slope the planes in which the above mentioned shoulders lie, these planes being indicated at 75A and 76A in Fig. 4. Thus, the planes 75A and 76A as viewed in Fig. 4 slope toward each other in a direction proceeding away from the edges 75 and 76 thereof and toward the inner face 80 of the retainer.

As was mentioned above, the retainer under the present invention is of resilient material to absorb the thrust that may be produced on the dust guard. It is therefore of advantage to be able to use a retainer of maximum thickness in this regard. As shown in Figs. 4 and 5, such increased thickness may be obtained by forming slots 85 in the opposed faces of the seal plate 61 in the lower marginal portion thereof to reduce the thickness of the plate 61 in these areas. This has the further effect of increasing somewhat the area of contact between the retainer and the related opposed face portions of the seal plate 61 due to the resultant shoulders 85S.

Another form of the invention is illustrated in Figs. 6 and 7 as embodied in a dust guard 100 including a relatively rigid seal plate 101 identical to the seal plates 26 and 61 described above. Thus, the plate 101 includes a pair of parallel side edges 103 and 104 and an arcuate bottom edge 105 joining the side edges 103 and 104, so that the plate 101 is generally U-shaped in appearance. The plate 101 has an upper edge 106 provided with divergent surfaces merging upwardly toward an apex, and when the dust guard has been disposed in the journal box dust guard slot, the upper edge 106 is exposed at the upper side of the dust guard slot. Positioned medially between the edges of the plate 101 thus described, there is a relatively large journal opening 108, and as described above the journal end of the car axle is adapted to be inserted through the opening 108 so as to extend into the journal box as illustrated in Fig. 1 of the drawing.

In the first embodiment described above, the upper walls as 46W and 47W of the retainer 35 are spaced, that is, interrupted, and have their inner boundary edges 46B and 47B extended to the opening 30 on opposite sides thereof. In the second embodiment described above, and illustrated in Figs. 4 and 5, the retainer 70 has the upper walls 73W and 74W thereof disposed in spaced relation one to the other and spaced below the journal opening 62. The inner boundary edges of the walls 73W and 74W merge with the lower extremities of the vertical shoulders having edges 75 and 76. The upper edges of these shoulders terminate at the end extremities of an intermediate upper wall 72W. In the embodiment of Figs. 6 and 7, the retainer 120 has but one uninterrupted upper wall on each side thereof, that is, the upper walls to be described extend across the retainer in an uninterrupted fashion from one point on the outer peripheral edge of the retainer to the diametric opposite point on the outer peripheral edge. Further, the upper wall is spaced at all points from the periphery of the opening 108, and all points in the plane thereof are substantially co-planar.

Specifically, the retainer 120, as in the foregoing embodiments, is provided on but opposed portions only of the opposed faces of the plate 101, such portions being at the lower area of the plate 101. Thus, the retainer 120 has opposed faces 121 and 122, Fig. 7, and is slotted or cored at 125 to afford a cavity of a width corresponding to the width of the lower periphery of the plate 101 between the opposed faces of the plate 101. The plate 101 and the retainer 120 can be integrated in any desired manner.

The retainer 120 is generally U-shaped in outline, being complemental to the configuration of the lower part of the plate 101, and thus has a lower arcuate wall 130W and an outer peripheral edge 131 corresponding thereto.

As in the foregoing embodiments, the retainer 120 is of substantial thickness in the vertical dimension between the outer peripheral wall 130W and the bottom edge or wall 105 of the plate 101, thereby enabling the retainer to absorb forces which would otherwise tend to damage the lower extent of the plate 101. Moreover, the thickness of the retainer 120 in the dimension between the opposed faces 121 and 122 thereof is substantially greater than the corresponding thickness of the plate 101, whereby the retainer 120 will have a tight press fit in the lower portion of the dust guard slot of the journal box to hold the dust guard in place.

The opposed faces 121 and 122 of the retainer are beveled, each to provide a related sloped upper wall 140W and 141W, the retainer in this instance again being symmetrical in all respects on the opposed faces thereof so that it is immaterial which face is disposed inwardly of the journal box. Thus, the sloped walls 140W and 141W will respectively shed lubricant and water depending upon the disposition of the dust guard 100 in the journal box.

Each upper wall as 140W is disposed wholly below the lower peripheral portion of the medial opening 108 in the plate 101, and thus each of the sloped upper walls 140W and 141W terminates at an upper edge 144 below the medial opening in the plate 101. Each wall 140W and 141W is, therefore, disposed in a plane as 140A, Fig. 6, which slopes downwardly away from the upper edge 144 in a direction toward the related face 121 or 122, whereby the planes as 140A represent shed surfaces which drain liquids away from the medial opening 108. Moreover, the walls 140W and 141W are each generally V-shaped in outline as viewed in Fig. 6 so as to lie in planes which slope downwardly away from the opposed ends E-2 of the outer peripheral edge 131 and toward the medial portion of the retainer 120 at a point below the lower boundary of the opening 108, thereby assuring that liquids drain away from the outer peripheral portion of the retainer.

It has been found advantageous to reinforce the portions of the ends of the retainers above the sloped upper walls thereof. As shown particularly in Fig. 6, webs 150 and 151 are formed on the retainer 120 so as to connect the outer end extremities E-2 of the retainer firmly to the side edges of the plate 101 above the sloped upper walls 140W and 141W. As shown in Fig. 7, the webs 150 are of the same width as the width of the plate 101 between the opposed inner and outer faces thereof.

As in the two foregoing embodiments described above, the retainer 120 is arcuately slotted parallel to the arcuate bottom wall thereof, and such slot is located medially between the opposed faces of the retainer, enabling the plate 101 to be located therein in an accurately centered relation.

It will be seen from the foregoing, that under the present invention there is afforded a dust guard for a railroad journal box including a relatively rigid seal plate having a resilient high friction retainer of such area as to represent but a segment of the area of the seal plate. The retainer so related in area to the seal plate has solid portions thereof disposed outwardly of the outer peripheral edge portions of the seal plate, and has the major area thereof provided on the seal plate below the journal opening in the seal plate. This enables the retainer to be inserted into the dust guard slot with a tight press fit in the bottom of the dust guard slot and in part in the vertical side extents of the dust guard slot. The retainer thus is capable of absorbing forces which might tend to crush or damage the lower edge of the seal plate, and the upper areas of the seal plate are spaced inwardly of the wall portions of the journal box which define the dust guard slot, and this enables the interior of the journal box to be vented.

The retainer is U-shaped having a U-shaped outer peripheral wall and edge, and includes an upper wall which may be entirely coplanar or unbroken, as in Figs. 6 and 7, or the upper wall may be interrupted. The upper wall preferable has its two end extremities coincident with the upper end extremities of the peripheral edge of the retainer as at E, E-1 and E-2. In any event, the upper wall is sloped preferably in two directions, downwardly away from lower boundary of the journal opening, and downwardly away from the opposite ends of the outer peripheral wall of the retainer, such downward sloping in each instance being toward the bottom of the retainer for the purposes described.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A journal box dust guard and comprising, a relatively rigid seal plate having front and rear faces and outer marginal portions, said plate having an opening formed in the medial portion between upper and lower edges thereof and through which a journal can be passed to rotate freely therein, and a resilient retainer member secured to said plate between the lower edge of the plate and said opening and extending about a portion only of the outer margin thereof to leave at least the portion of the plate above said opening free of said retainer, said retainer having a slot therein in which is mounted at least a part of such marginal portion of said plate between the lower edge and said opening, and said retainer having a top wall terminating below the top of the opening in said plate and on either side thereof, said retainer top wall lying in a plane that slopes downwardly away from the adjacent face of said plate, and said retainer having a resilient bottom wall of substantial thickness adapted to undergo compression and absorb forces which would otherwise damage the lower edge of said plate.

2. A dust guard retainer for a journal box dust guard, said retainer having one side face adapted to face outwardly of said journal box and another side face adapted to face inwardly of said journal box, said retainer being adapted to have a dust guard seal plate associated therewith between said sides, said retainer having an outer peripheral wall with a peripheral edge and each such side of the retainer being symmetrical in outline and terminating at an uuper wall having an upper edge, said upper wall lying at least in part in a plane that slopes downwardly in a direction proceeding away from at least one of said peripheral and upper edges and toward the bottom of said retainer to drain liquids away from said one edge.

3. A dust guard retainer according to claim 2 wherein the surface of said upper wall is substantially smooth and extends between said peripheral edges.

4. A dust guard for a journal box and comprising, a relatively rigid seal plate having front and rear faces and outer marginal portions, said plate having straight substantially parallel side edges and an arcuate bottom, said plate having an opening formed in the medial portion thereof through which a journal can be passed to rotate freely therein, and a retainer of resillient material having sides of substantial thickness provided on opposed lower portions only of the faces of said plate to leave a substantial remainder of said plate above said opening free of such resilient material, said retainer having an outer arcuate peripheral wall with a peripheral edge extended about the arcuate bottom of said plate and said opposed sides of the retainer each terminating at upper walls having upper edges, said upper walls of the retainer each lying at least in part in respective planes that slope downwardly in a direction proceeding away from at least one of said peripheral and upper edges and toward the bottom of said retainer to drain liquids away from said one edge.

5. A dust guard according to claim 4 wherein said upper walls and upper edges are wholly spaced from said medial opening, and wherein the retainer is provided with an arcuate slot in which the arcuate bottom of said plate is disposed.

6. A dust guard retainer for a journal box dust guard, said retainer having an outer peripheral wall with a peripheral edge having end extremities above the bottom of said retainer, an upper wall with an upper edge having end extremities coincident with the first-named end extremities, and a solid face portion between said edges, and at least a portion of the upper wall of said retainer lying in a plane that slopes downwardly in a direction proceeding away from the end extremities of said peripheral edge and toward the bottom of said retainer, and lying also in a plane that slopes downwardly in a direction proceeding from said upper edge toward said solid face and the bottom of said retainer.

7. A dust guard for a journal box having spaced walls defining a dust guard slot and comprising, a relatively rigid seal plate having upper and lower edges and opposed faces, said plate having outer marginal side and bottom portions inserted into said slot, said plate having an opening formed in the medial portion thereof between the upper and lower edges thereof and through which a journal can be passed to rotate freely therein, and a one-piece retainer of resilient material of greater thickness than said plate and provided on opposed portions only of the faces of said plate at the bottom marginal portion of said plate to leave the remainder of said plate exposed and free of such resilient material, said retainer having opposed inner and outer faces and an outer peripheral wall and edge, said outer peripheral wall and portions of the opposed inner and outer faces of said retainer being fitted tightly in said dust guard slot to dispose said free portion of said plate in spaced relation to the walls of the dust guard slot at the top thereof to vent the journal box, and portions of said opposed faces of the retainer terminating at upper walls having upper edges, said upper walls of the retainer at least in part being free of said dust guard slot and lying adjacent said medial opening and lying at least in part in planes that slope downwardly from at least one of said peripheral and upper edges of the retainer and toward the bottom of said retainer.

8. A dust guard retainer for a journal box dust guard, said retainer being of an arcuate configuration in side elevation and having a laterally extending arcuate groove formed in an upper portion thereof for receiving the lower portion of a dust guard seal plate therein, said retainer having both an arcuately curved upper surface in the central portion thereof, adapted to engage an under surface of a rotatable journal, and planar inclined upper surfaces disposed at the extremities of said curved upper surface and sloped downwardly for drawing fluid away from a seal plate mounted within said groove.

9. A dust guard retainer as defined in claim 8 wherein said retainer includes a shoulder having a planar surface extending traversely between the arcuately curved upper surface and a planar inclined upper surface at each extremity of the arcuately curved upper surface for draining fluid from the area of said arcuately curved upper surface.

References Cited in the file of this patent
UNITED STATES PATENTS

| | | |
|---|---|---|
| 19,840 | Geisendorff | Apr. 6, 1858 |
| 471,069 | Godley | Mar. 15, 1892 |
| 606,232 | Patten | June 28, 1898 |
| 1,979,215 | Means | Oct. 30, 1934 |
| 2,159,825 | Stevens | May 23, 1939 |
| 2,165,102 | Kimball | July 4, 1939 |
| 2,241,870 | Scribner | May 13, 1941 |
| 2,668,067 | Fitzsimmons | Feb. 2, 1954 |
| 2,837,355 | Johnson et al. | June 3, 1958 |